United States Patent Office 3,411,863
Patented Nov. 19, 1968

3,411,863
PROCESS FOR CHEMICALLY ATTACHING COMPOUNDS TO AMINIZED CELLULOSE BY MEANS OF FORMALDEHYDE
John D. Guthrie, New Orleans, La., Marcia S. Pottle, Ithaca, N.Y., and Matthew F. Margavio, Metairie, La., assignors to the United States of America as represented by the Secretary of Agriculture
No Drawing. Filed July 16, 1965, Ser. No. 472,741
47 Claims. (Cl. 8—129)

ABSTRACT OF THE DISCLOSURE

A process for the chemical modification of aminized cellulose. The process provides versatile method of attaching a great variety of compounds to aminized cellulose. The aminized cellulose will react with formaldehyde in conjunction with, for example, the following compounds: phenols, ketones, acids, esters amides, nitriles, dyes and ethers.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for the chemical modification of aminized cellulose. More particularly, this invention relates to a process for the chemical modification of aminized cellulose as represented by a partial 2-aminoethyl ether of cellulose, the preparation of which ether of cellulose is described in U.S. Patent 2,459,222.

The object of this invention is to provide a versatile process for chemically attaching a great variety of compounds to aminized cellulose. By selection of suitable compounds and reaction conditions a number of useful properties can be imparted to cellulose in the form of fibers, yarn, or fabric. These include: increased wet resistance, giving smooth-drying properies to cellulosic fabrics; resistance toward micro-organisms as shown by soil burial tests; ion-exchange properties giving celluloses of value in biochemical separations; covalently attached colors of good wash fastness, and, in some cases, good lightfastness; chemically attached colors that change with changes in acidities, thus offering celluloses with durable indicator properties of value for use in indicator test papers; and flame resistance.

We have discovered that aminized cellulose will react with formaldehyde in conjunction with certain other compounds described below. The reaction is conveniently carried out in aqueous solution; however, in certain cases, the formaldehyde can be applied in vapor form to the aminized cellulose that has been impregnated with the reactive compound. The compounds which can be reacted with aminized cellulose in this manner are, in general, compounds which are known to react with formaldehyde under selected conditions. These compounds include phenols and naphthols; ketones; benzophenones; acids, esters amides, nitriles, and sulfones having hydrogen atoms activated by two adjacent carbonyl, nitrile, or sulfone groups; dyes and indicators having phenol or naphthol hydroxy groups ortho or para to hydrogen atoms; and compounds having hydrogen atoms activated by adjacent nitro groups.

Although such compounds have been shown previously to react with formaldehyde they have not hitherto been attached by formaldehyde to a 2-aminoethyl cellulose or other aminized cellulose. Such compounds have also been previously coupled with simple primary and secondary amines by formaldehyde to make monomeric compounds, but have not been previously coupled by formaldehyde with aminized cellulose, a highly polymeric material containing covalently attached amino groups sparsely spaced along the polymer chain molecules. It is surprising that such a polymeric material of limited accessibility and reactivity will react in our process to acquire such useful properties as smooth-drying character, resistance to degradation by micro-organisms, covalently attached indicator action; ion-exchange character, etc., depending on the compound and processing conditions selected.

The versatility of the process of our invention provides for treatment of cotton and other cellulosic textiles using aqueous solutions, in a wide range of concentrations and temperatures, to react with aminized cellulosic materials containing about from 0.3% to 1.5% nitrogen, to produce a wide variety of properties, which in many instances can be combined.

In practicing this invention, we have used 2-aminoethylated cotton cellulose in the form of fabric because of its availability and convenience. This aminized cellulose may also be made in the form of fiber or yarn and can be used in this form in the practice of our invention. It can also be made in the form of paper, viscose rayon, ramie, flax, and the like, and so used in our invention. Although the aminized cellulose used contained about 0.7% nitrogen, products which contain about from 0.3% to 1.5% nitrogen are available in fiber, yarn, or fabric form and can be used in our invention. Our invention is also applicable to other types of aminized cellulose in fibrous form, in which primary or secondary amino groups are covalently attached to cellulose.

A preferred way of practicing our invention is to place the aminized cellulose in an aqueous solution containing formaldehyde and the compound to be attached. (In certain cases, it is desirable to add a base such as sodium hydroxide to aid in the solubilization of the compound, and to promote the reaction.) The solution is then heated at or near its boiling point for about from 0.5 to 7 hours. With certain compounds the aminized cellulose may be allowed to stand in the solution at room temperature (20° to 32° C.) for about from 8 to 48 hours. The reaction temperature may therefore range about from 20° to 105° C., and the reaction time about from 0.5 to 72 hours, using the shorter times with the higher temperatures; and selecting conditions on the basis of the reactivity of the compound and the degree of reaction desired. The amount of compound used may be varied about from 0.1% to 100% of the weight of the aminized cellulose used. The volume in milliliters of the 37% aqueous formaldehyde solution (stabilized with methanol) used is usually about twice that of the weight of the aminized cellulose in grams, but may be varied about from 0.5 to 4 times the weight of the aminized cellulose. Sources of formaldehyde other than the common 37% aqueous solution may be used. The ratio, which is not critical, of milliliters of solution to weight of the aminized cellulose in grams, may be varied about from 10:1 to 50:1, respectively. After the reaction is completed, the aminized cellulose is washed thoroughly in hot tap water. It is then usually soaked for an hour or more in hot tap water made alkaline with sodium hydroxide to insure removal of any products not covalently attached to the cellulose; then washed again thoroughly in hot tap water, and air dried. Suitable control experiments were run with cellulose that had not been aminized; and also in which certain components of the process were omitted, especially formaldehyde, to insure that both the amino groups of the aminized cellulose and the formaldehyde were essential to the process.

Prior to submitting the final products of our invention and their appropriate controls to testing these were washed in tap water, then soaked in a hot dilute NaOH solution, and washed and dried or otherwise suitable washed.

To evaluate the final products of our invention most of the samples were submitted to one or more of these tests. The smooth-drying evaluation was according to the method of Laurence and Phillips, Am. Dyestuff Reptr., 45,548, 1956 (average of six samples). Dyeing fading resistance was done according to AATCC 16A–1957. And the resistance to attack by micro-organisms was evaluated by a modification of the procedure described in ASTM D684–54.

Our invention is further illustrated by the following examples, in which all percentages are by weight.

EXAMPLE 1

Preparation of an aminized cellulose and its reaction with phenol and formaldehyde Aminized cellulose, in the form of aminized cotton fabric, containing 0.7% nitrogen was made from 208 yards of 48 x 48 peroxide bleached cotton sheeting. The sheeting was padded twice with a solution containing 30% sodium hydroxide, 20% 2-aminoethyl sulfuric acid, and 50% water, and a wet pickup of 164% was obtained. The impregnated sheeting was dried and cured on rotating cams that were heated with steam at 36.5 pounds pressure per square inch. The heating time on the cans was 15 minutes. The fabric was washed thoroughly with cold tap water, hot tap water, an aqueous 0.5% $NH_4OH$ solution and then with hot tap water. The fabric was dried on a tenter frame. It had a wet crease recovery angle of 260° (W+F) when tested according to the method of Laurence and Phillips, Am. Dyestuff Reptr., 45,548, 1956 (av. of 6 samples). A control fabric was made by padding another quantity of the same cotton sheeting with an aqueous 25% sodium hydroxide solution, curing and processing in the same manner.

A 5 gm. sample of the aminized cotton fabric was refluxed for 2 hours in a solution composed of 10 gm. of phenol, 170 ml. of water, and 30 ml. of an aqueous 37% formaldehyde solution (stabilized with methanol). The sample was then washed thoroughly in hot, running tap water (about pH 10) for 1 hour, air dried, and a portion tested by placing in an alcoholic solution of ferric chloride. The test of this portion gave a black color, indicative of attached phenolic groups.

Another positive test for phenolic groups (red color) was obtained when a second portion of the sample was placed in a solution containing diazotized sulfanilic acid which was made alkaline with $Na_2CO_3$ after the sample was immersed. The original aminized cotton cellulose was negative in these tests.

Another sample of the aminized cotton fabric was allowed to stand for three days in the phenol-formaldehyde solution of the composition described above at about 27° C., after which the fabric was washed thoroughly in hot tap water and air dried. It gave positive tests for phenolic groups with ferric chloride and with diazotized sulfanilic acid. Aminized cotton fabric treated similarly with 10 gm. of phenol and 200 ml. of water (formaldehyde omitted) gave negative tests for phenolic groups. Similar results were obtained when 10 ml. of 10% aqueous sodium hydroxide solution was added to the reaction mixtures prior to reaction. Pieces of the NaOH control fabric described above were treated similarly with the various solutions described above. After washing in hot running tap water, tests for phenolic group were negative showing that the amino groups were needed for the attachment of phenolic groups under the described reaction conditions.

EXAMPLE 2

Phenol and substituted phenols

A 4.822 gm. sample of the aminized cotton fabric of Example 1 was refluxed for five hours in a solution composed of 2 ml. of melted phenol, 10 ml. of 37% formaldehyde solution and 5 ml. of 10% aqueous NaOH solution. The sample was then washed several hours in hot tap water, allowed to stand over night in approximately 1% aqueous NaOH solution, washed thoroughly in hot tap water, and air dried. The sample now weighed 5.428 gm., representing an add-on of 12.6%. The color of the fabric sample was light brown. It was tested for resistance to micro-organisms by the soil burial test in which it remained intact for 12 weeks. The original aminized cotton fabric (0.7% nitrogen content) rotted in 3 weeks (average of 30 samples). The NaOH control cotton fabric rotted in 1 week.

Other samples of the aminized cotton fabric prepared in Example 1 were processed with various substituted phenols by the procedure described above with phenol. These included: o-, m, and p-chlorophenol; o-, m-, and p-bromophenol; p-tert-amylphenol and p-cyclohexylphenol. The observed weight add-ons were 35%, 16%, 31%, 41%, 19%, 24%, 26%, and 22%, respectively. The color of the product from para-cyclohexylphenol was light yellow. The other products ranged in color from brownish yellow, through brown to dark purplish brown. All of the fabrics processed with these substituted phenols and formaldehyde remained intact for 12 weeks in the soil burial test. The sample processed with o-bromophenol showed significantly more flame-resistance than the original aminized cotton fabric when tested in a strip burning test. When a 1 cm. strip of the treated fabric was held in a position 100° from the vertical, with the fabric surface vertical, and lighted at the lower end, it did not burn completely; while the untreated aminized fabric burned completely in this position.

When samples of the NaOH control fabric prepared in Example 1 were similarly reacted with the mono-halogenated phenols above in the presence of formaldehyde and aqueous NaOH some attachment to the cellulose was noted as indicated by the weight gains, which ranged from 4% to 8%.

A 5.070 gm. sample of the aminized cotton fabric of Example 1 was refluxed for 5 hours with a solution composed of 1 gm. of p-nitrophenol, 10 ml. of an aqueous 37% formaldehyde solution, and 100 ml. of water, then washed thoroughly with distilled water with frequent changes during 18 hours. This was followed by exhaustive alkaline washes including hot tap water to which NaOH had been added. After a thorough final washing in hot tap water the sample was air dried. The weight add-on was 3.7%, and the color of the fabric was bright yellow. A control experiment wherein a solution composed of 1 gm. p-nitrophenol and 110 ml. of water was used without the formaldehyde yielded a sample with a weight add-on of 1.9%. This sample was colored yellow, but the intensity of the color was not as high as that one treated with the solution including the formaldehyde.

A 5.534 gm. sample of the aminized cotton fabric of Example 1 was refluxed for 6 hours with a solution composed of 2 gms. of salicylic acid, 15 ml. of an aqueous 10% NaOH solution, 10 ml. of an aqueous 37% formaldehyde solution, and 150 ml. of water, then washed in hot tap water, in approximately 1% hot aqueous NaOH solution, then in tap water overnight, and allowed to air dry. The weight add-on was 4.8%, and the color of the finished product was light brown. The fabric had wet crease resistance in a hand-crumpling test under water. The wet crease-recovery angle by standard testing was 323° (W plus F). The sample dyed a dark blue when tested with methylene blue. This test indicated the presence of carboxyl groups as well as cation-exchange properties. When a control experiment wherein the formaldthyde was omitted was run under similar conditions the weight add-on was negligible.

EXAMPLE 3

Beta-naphthol

A 5.080 gm. sample of the aminized cotton fabric of Example 1 was refluxed for 5 hours with a solution composed of 4 gm. beta-naphthol, 5 ml. of an aqueous 10% NaOH solution, 10 ml. of an aqueous 37% formaldehyde solution, and 150 ml. of water. After thoroughly washing the sample in hot tap water, and allowing it to air dry the weight add-on was 4.7%, and the color of the sample was brown. Under soil burial testing the sample was withdrawn intact after 9 weeks of exposure.

EXAMPLE 4

Malonic acid

Malonic acid reacted readily with aminized cellulose and formaldehyde under a variety of conditions to attach carboxyl groups, readily demonstrated by dyeing with methylene blue. It reacted under acidic or neutral conditions, and when either refluxed or allowed to stand in the solution at room temperature. In the room temperature experiments, pressure developed in the closed flasks, possibly due to decarboxylation taking place during the reaction. The experiments with malonic acid are summarized in the following table:

covery value against a similarly treated sample wherein the formaldehyde treatment was omitted. The values were 304° and 283°, respectively.

The reaction products of the malonic acid—formaldehyde—aminized cellulose combinations can be of value as ion-exchange celluloses having both acidic and basic properties. The basic properties of the finished products may be demonstrated by the simple expedient of dyeing the said finished products with Kiton Fast Red, an acid dyestuff.

EXAMPLE 5

Compounds having hydrogen atoms activated by two adjacent carbonyl, nitrile, or sulfone groups Samples of the aminized cotton fabric of Example 1 were reacted separately with cyanoacetic acid, malononitrile, malonamide, ethylacetoacetate, acetoacetanilide, and trimethylene trisulfone in conjunction with formaldehyde—some by immersing in solution to react at room temperature and some by refluxing in a flask. All were TABLE I.—REACTION OF AMINIZED COTTON WITH MALONIC ACID IN CONJUNCTION WITH FORMALDEHYDE

| Fabric | Solution Used | | | Method of Treatment | Wt. Gain, Percent | Color with M.B.[5] | Wet C. R. (W+F)deg. |
|---|---|---|---|---|---|---|---|
| | Malonic Acid, g. | HCHO, ml. | H²O, ml. | | | | |
| Aminized | 5 | 10 | 175 | 4 hr. reflux [1] | 9.4 | Almost black | 296 |
| Do | 5 | 10 | 175 | do.[2] | 5.4 | do | 295 |
| Do | 5 | 0 | 175 | do.[2] | 1.4 | V. light blue [4] | 280 |
| Do | 0 | 10 | 175 | do | 1.8 | do | 290 |
| Do | 5 | 10 | 175 | 1 day R. T.[1] | 7.0 | Almost black | [3] 303 |
| Do | 5 | 10 | 175 | 1 day R. T.[2] | 5.8 | do | 298 |
| Do | 5 | 0 | 175 | 1 day R. T.[2] | 2.0 | V. light blue [4] | |
| Do | 0 | 10 | 175 | 4 hr. reflux | 1.2 | do | |
| Do | 5 | 10 | 130 | 1 day R. T.[2] | 6.5 | Almost black | 295 |
| Do | 0 | 0 | 0 | None | 0.0 | V. light blue | [6] 260 |
| NaOH Contr | 5 | 10 | 130 | 1 day R. T.[2] | 1.8 | Medium blue | |
| Untr. Contr | 5 | 10 | 130 | 1 day R. T.[2] | 0.9 | Light blue | |

[1] pH 2.
[2] Adjusted to pH 6 by addition of 30 ml. 10% NaOH solution.
[3] Combined formaldehyde content 0.1%.
[4] Very light blue, about same as untreated aminized fabric.
[5] Methylene blue.
[6] Average of 9 determinations.

Malonic acid—formaldehyde vapor procedure

A sample of the aminized cotton fabric of Example 1 was padded with an aqueous 10% solution of malonic acid and allowed to air dry. The impregnated fabric sample portions were placed in a closed container and kept at about 24° C. for 4, 7, and 12 days exposure to the formaldehyde vapors evolved from a paraformaldehyde excess which was placed in the said closed container. After each sample was removed it was washed thoroughly with hot alkaline tap water, then allowed to air dry. All samples dyed almost black when subjected to the methylene blue dye test, indicating strong cation-exchange properties due to carboxyl groups in the treated samples, and showed good wet crease recovery in hand-crumpling tests while the sample was under water. That portion of the sample which was treated with malonic acid and exposed to formaldehyde vapors for 12 days was evaluated for wet wrinkle resistance by comparing its crease rewashed thoroughly in hot tap water, soaked in a suitable length of time in an aqueous 1% NaOH solution, and washed again in tap water, then allowed to air dry. Table II shows some of the pertinent conditions and results of this group of samples.

TABLE II.—REACTIONS OF AMINIZED COTTON WITH COMPOUNDS HAVING HYDROGEN ATOMS ACTIVATED BY TWO ADJACENT CARBONYL, NITRILE, OR SULFONE GROUPS IN CONJUNCTION WITH FORMALDEHYDE

| Compound | Reacting Solution | | | Reaction conditions | Add-on, % | Color Imparted | Wet Crease Recovery (W+F) |
|---|---|---|---|---|---|---|---|
| | 37% Formaldehyde, ml. | 10% NaOH, ml. | H²O, ml. | | | | |
| Cyanoacetic acid, 2 ml | 10 | 15 | 100 | 5 hr. reflux | [1] 6.0 | Brown [2] | 313° |
| Malononitrile, 5 g | 10 | 0 | 150 | 24 hr. R. T | 9.7 | Yellow | 300° |
| Do | 10 | 0 | 150 | 48 hr. R. T | 10.6 | do | 300° |
| Do | 10 | 0 | 150 | 4 hr. reflux | [3] 13.7 | do | 309° |
| Malonamide, 4 g | 10 | 0 | 150 | 5 hr. reflux | 8.1 | None | 309° |
| Ethylacetoacetate, 5 g | 10 | 0 | 150 | do | 22.0 | Brown | 322° |
| Acetoacetanilide, 1.5 g | 10 | 0 | 150 | do | 22.1 | Yellow | 288° |
| Trimethylene trisulfone, 1.5 g | 10 | 0 | 200 | 4 hr. reflux | [4] 14.7 | Brown | 312° |

[1] Nitrogen content 2.9%, formaldehyde content 0.7%.   [2] No change in color after 40 hr. in Fade-Ometer.   [3] Nitrogen content 1.05%, formaldehyde content 0.2%.   [4] Sulfur content 2.2%.

It may be noted that these compounds, except for acetoacetanilide, gave very high wet crease recovery values. In comparison, the aminized cotton fabric refluxed for 5 hours with a solution composed of 10 ml. of an aqueous 37% formaldehyde solution, 5 ml. of an aqueous 10% NaOH solution, and 100 ml. of water gave a wet wrinkle recovery angle of 287° (W + F). When the formaldehyde was omitted from the latter solution a value of 285° was obtained. The aminized cotton fabric used in the experiments had a wet crease recovery angle of 260° (W + F). The acetoacetanilide treated fabric remained intact for 7 weeks in the soil burial test, indicating a moderate degree of resistance to micro-organisms. The malononitrile processed samples dyed darkly with methylene blue and had a low nitrogen content indicating some hydrolysis of the nitrile groups during the reaction. When malononitrile was reacted similarly by refluxing in aqueous solution with aminized collulose, but without formaldehyde, a weight add-on of 2.4% was observed, indicating that this compound may also react with aminized cellulose by a mechanism not requiring formaldehyde.

EXAMPLE 6

Ketones

A 5.179 gm. sample of the aminized cotton fabric of Example 1 was refluxed for 4.5 hr. with a solution composed of 5 ml. acetone, 10 ml. of an aqueous 37% formaldehyde solution, 5 ml. of an aqueous 10% NaOH solution, and 100 ml. of water. It was then washed thoroughly in hot tap water and air dried. The weight add-on of the finished sample was 14%. The color was yellow, which turned brown after 10 hrs. in a Fade-Ometer. The product remained intact for 12 weeks in the soil burial test, indicating resistance to micro-organisms. In control experiments in which aminized cotton fabric was refluxed in solutions from which the acetone, the NaOH, or both were omitted, the weight add-ons were 0.9, 1.7, and 1.4%, respectively; and the time required to rot these controls in the soil burial test was 3, 4, and 3 weeks, respectively.

Samples of the aminized cotton fabric of Example 1 were treated with acetophenone, with mesityl oxide, and with 2,4-pentanedione in the process described above for acetone, except that 150 ml. of water was used. The weight add-ons were 15.7, 17.9, and 12.3%, respectively; the rotting times were 11, 11 and 5 weeks, respectively; and the wet wrinkle recovery angles were 293, 313, and 321° (W+F), respectively. The colors imparted to the fabrics were yellow. When 2,4-pentanedione was refluxed alone in aqueous solution with aminized cellulose, a weight add-on of 2.0% was observed, indicating that it may also react to some extent with aminized cotton by a mechanism not requiring formaldehyde.

A 5.036 gm. sample of the aminized cotton fabric of Example 1 was refluxed for 5 hours with a solution composed of 1 gm. of 1,3-dichloro-2-propanone, 10 ml. of an aqueous 37% formaldehyde solution, and 100 ml. of water. After the usual thorough alkaline washes the fabric was air dried. The weight add-on was 7.8%; the color was brown; and the wet crease recovery angle was 313° (W+F). A control experiment in which the formaldehyde was omitted gave a weight add-on of 1.9% and a wet crease recovery angle of 285° (W+F).

EXAMPLE 7

Benzophenone derivatives (ultraviolet absorbers)

A 5.263 gm. sample of the aminized cotton fabric of Example 1 was refluxed for 5 hours with a solution composed of 1 gm. of 2,4-dihydroxybenzophenone, 15 ml. of an aqueous 37% formaldehyde solution, 25 ml. of an aqueous 10% NaOH solution, and 100 ml. $H_2O$. The NaOH solution was added in 5 ml. portions initially and at 1 hour intervals. The final solution was about pH 6. After a thorough washing in hot, running tap water and air drying, the weight add-on of the sample was 12.9%. After 4 extractions with cold acetone, the weight add-on was 11.7%. The product remained intact by 8 weeks burial in the soil burial test, indicating considerable resistance to micro-organisms. The brown color of the fabric became a darker shade of brown after 10 hours in a Fade-Ometer. When an aqueous solution of the compound above was refluxed with aminized cotton omitting the formaldehyde the weight add-on was 1.0%, and a slight yellow color was imparted to the fabric.

Other samples of aminized cotton fabric were processed in the same manner with 2-hydroxy-4-methoxybenzophenone, with 2-hydroxy-4,4'-dimethoxybenzophenone, and with 2,2',4,4'-tetra-hydroxybenzophenone. The weight add-ons were 5.2%, 5.4%, and 6.0%, respectively, after the acetone extraction described in the paragraph above. A portion of the product from treatment with 2,2',4,4'-tetrahydroxybenzophenone remained intact after 6 weeks in the soil burial test and another portion of the product had a wet crease recovery of 301° (W+F). The product from 2-hydroxy-4,4'-dimethoxybenzophenone took 40 hours to turn a darker shade of brown in a Fade-Ometer.

A sample of the aminized cotton fabric of Example 1 processed with 2-hydroxy-4,4'-dimethoxybenzophenone in a manner similar to that described above and selected on basis of its excellent resistance to fading in a Fade-Ometer with a mere 2% weight add-on was exposed on a weather rack for comparison with the original aminized cotton fabric. No protection against weathering was observed. It is possible that protection might have been observed at a higher add-on or with one of the other benzophenone derivatives.

EXAMPLE 8

Fluorescein and its halogen derivatives

A 4.810 gm. sample of the aminized cotton fabric of Example 1 was refluxed for 5 hours in a solution composed of 1 gm. of fluorescein, 10 ml. of an aqueous 37% formaldehyde solution, 5 ml. of an aqueous 10% NaOH solution and 100 ml. of water. After the usual hot tap water and alkaline washes, it was air dried. The weight add-on of the sample was 7.0%. The color was a bright orange red, durable to alkaline washing, but of poor light-fastness (Fade-Ometer time 10 hours). The color changed reversibly to yellow at a pH of about 2. This product can be classified as an indicator for all forms of cellulose. The wet wrinkle-recovery value of the finished sample was 294°. When the aminized cotton fabric of Example 1 was refluxed with an aqueous solution of fluorescein wherein the formaldehyde and NaOH were omitted the weight add-on was negligible; however some reaction was indicated by the durable, light yellowish orange coloration noted on the sample.

Fluorescein, in the presence of formaldehyde and NaOH, gave some evidence of reacting slightly with both the NaOH treated control fabric of Example 1 and the original untreated cotton fabric in that a very light orange coloration was obtained on the reacted fabrics.

It was found that fluorescein could be reacted with formaldehyde in the presence of sodium hydroxide to yield a product that could be dissolved in water, padded on aminized cellulosic fabric and fixed in a durable form by curing at an elevated temperature to produce a bright orange red colored product. A solution composed of 2 gms. of fluorescein, 100 ml. of water, 40 ml. of an aqueous 37% formaldehyde solution, and 20 ml. of an aqueous 10% NaOH solution was refluxed for 5 hours, during which time additional reagents were added in the following manner: A 20 ml. portion of the formaldehyde solution was added after the original mixture refluxed 1 hour. A second 20 ml. portion of the formaldehyde solution was added after refluxing 2 hours. Also to the original mixture an additional 40 ml. of the aqueous NaOH solution was added in 10 ml. increments, at half-hour intervals, timed from the start of the refluxing. The solution was allowed to stand overnight and the product precipitated by alternate addition of dilute HCl and dilute NaOH and cooling in a refrigerator, followed by addition of 100 ml. of acetone. After standing in the refrigerator for 3 days, the product was filtered, washed with water, and dried.

The product was a solid, presumably a methylol derivative of fluorescein, and weighed 2.30 gm. A solution of it did not fluoresce significantly.

A 200 mg. portion of the product was dissolved in 1 ml. of water and 2 ml. of concentrated $NH_4OH$ solution, and applied to a sample of the aminized cotton fabric of Example 1. The impregnated fabric was air dried and cured for 10 minutes at 140° C. The reacted fabric sample was colored a bright orange red, which proved to be durable to alkaline washing.

A sample of the aminized cotton fabric of Example 1 was reacted with 4',5'-dibromofluorescein in a manner similar to that described in the first paragraph of Example 8 for the reaction with fluorescein. The weight add-on of the reacted sample was 3.6%, and the coloration of the product was reddish orange, which was durable to alkaline washes and had good lightfastness (Fade-Ometer time 60 to 80 hours). Indicator action similar to that observed with fluorescein was observed here. The wet crease recovery value was 293° (W plus F). Like fluorescein, this compound gave some evidence on the basis of color of reacting with aminized cotton in absence of formaldehyde; however the weight add-on was negligible.

A sample of the aminized cotton fabric of Example 1 was reacted with 2',7'-dichlorofluorescein in a manner similar to that described in the first paragraph of Example 8 for the reaction with fluorescein. The weight add-on of this reacted sample was 5.3%, and the color of the product was bright red, was durable to alkaline washes, and had good lightfastness (Fade-Ometer time 40 hours). It showed indicator action similar to fluorescein. The wet crease recovery of the reacted sample was 289° (W plus F). The 2',7'-dichlorofluorescein gave a light pink color to the reacted product when the fabric employed was the untreated control cotton or the NaOH treated control fabric in the presence of formaldehyde and NaOH. The weight add-ons were about 1%, indicating some attachment to cellulose without the necessity of formaldehyde. It showed some evidence, on the basis of color, of reacting slightly with aminized cotton in the absence of formaldehyde.

EXAMPLE 9

Indicators and other colored compounds

Several 5 gm. samples of the aminized cotton fabrics of Example 1 were refluxed separately for 5 hours with solutions composed of 10 ml. of an aqueous 37% formaldehyde solution, 5 ml. of an aqueous 10% NaOH solution, 150 ml. of water, and 0.2 to 2.0 gm. quantities of various indicators and colored compounds having hydrogen ortho or para to a phenolic hydroxy group. After the usual thorough alkaline washing, the products were air dried. The results are summarized in Table III.

solutions of phenolthalein, formaldehyde, and NaOH, 4 times for 4 hours refluxing each time, a dark purple fabric was obtained indicating that phenolthalein may be attached slowly by formaldehyde to cellulose that has not been aminized, the reaction presumably involving the cellulosic hydroxyl groups. Some of the other compounds listed in the above table also gave some evidence of slowly attaching to unaminized cellulose in the presence of formaldehyde.

In the course of the experimentation, it was observed that certain colored compounds would attach to aminized cellulose as readily in the absence of formaldehyde as in its presence. These include: m-cresolsulfonphthalein, dichlorophenolsulfonphthalein, diphenyl green bluish, eosin, 4-nitro-2-chlorophenol, and 3',3",5',5"-tetrabromophenolsulfonphthalein.

EXAMPLE 10

Nitromethane

A 5.341 gm. sample of the aminized cotton fabric of Example 1 was refluxed for 5 hours with a solution composed of 2 ml. of nitromethane, 10 ml. of an aqueous 37% formaldehyde, 5 ml. of an aqueous 10% NaOH solution, and 100 ml. of water. After thorough washing in hot, running tap water, the fabric was air dried. The weight add-on was 9.5%. The color of the sample was brown. The wet wrinkle recovery angle was 306° (W + F). The finished fabric sample dyed a dark blue with methylene blue. In the soil burial test it remained intact for 9 weeks. Similar experiments were made in which the aminized fabric remained in the above-described solution for 24 to 48 hours at room temperature (about 27° C.). Add-ons of 6% to 8% were obtained. The wet wrinkle recovery values for these samples were 312° to 315° (W + F).

When nitromethane alone in aqueous solution was reacted with aminized cotton of Example 1 by refluxing or at room temperature, some reaction was indicated by weight add-ons of 1% to 2%.

We claim:
1. A process for reacting a partial 2-aminoethyl cellulose ether of cotton, wherein the nitrogen content of the said ether is about from 0.3% to 1.5%, with an aqueous

TABLE III.—REACTIONS OF AMINIZED COTTON WITH INDIVIDUAL MIXTURES OF INDICATORS AND OTHER COLORED COMPOUNDS IN CONJUNCTION WITH FORMALDEHYDE

| Compound | Add-on, % | Color | Color Change | Observations |
| --- | --- | --- | --- | --- |
| Aurin C. I. 43800 | 7.8 | Reddish purple | Red at pH 2 | Fade-Ometer time 50 hr.[1] |
| Carmine C. I. 75470 0.2 g | 3.4 | ....do | Lighter at pH 2 | Do. |
| o-Cresolphthalein 0.2 g | 4.0 | Purple | Colorless at pH 3 | Fade-Ometer 5 hr. |
| o-Cresolsulfonphthalein 0.5 g | 3.7 | D. purple | Red at pH 2 | Fade-Ometer 10 hr. |
| 5',5"-Dibromo-o-cresolsulfonphthalein 0.5 g | 2.1 | Greenish black | Yellow at pH 2 | Fade-Ometer 5 hr. |
| 3',3"-Dibromothymolsulfonphthalein 0.5 g | 2.2 | Green | ....do | Do. |
| Phenolphthalein 1 g | 12.0 | Purple | Colorless at pH 3.5 | Fade-Ometer 5 hr.[2] |
| Phenolsulfonphthalein 0.5 g | 3.2 | Reddish purple | Red at pH 2 | Fade-Ometer 10 hr. |
| Quinizarin-2-sulfonic acid Sodium Salt 2 g | 7.8 | Black | None | Fade-Ometer 40 hr. |
| Resazurin [3] 0.2 g | 4.7 | Bluish black | Red at pH 1.5 | Fade-Ometer 70 hr. |

[1] Intact after 9 weeks in soil burial test.
[2] Intact after 8 weeks in soil burial test; wet crease recovery 300° (W+F).
[3] 7-Hydroxy-3H-phenoxazin-3-one-10 oxide.

It was found that the color imparted by some of the compounds was of good lightfastness. Most of the fabrics showed reversible color changes with acidity, indicating that cellulose with chemically attached indicator groups may be produced in this may. Most of the compounds listed imparted some color to aminized cellulose when it was refluxed with an aqueous solution of the compound alone. In general, the weight add-ons from the compound applied in this way without formaldehyde were negligible or much smaller than obtained with formaldehyde.

When the NaOH treated control cotton of Example 1 was refluxed with an aqueous solution containing phenolphthalein, formaldehyde, and NaOH, similar to that described above, it was colored a light purplish pink. The weight add-on was 1.9%. When the NaOH treated control fabric was treated by repeated refluxing with fresh mixture of formaldehyde and a phenolic compound selected from the group consisting of phenol,
o-chlorophenol,
m-chlorophenol,
p-chlorophenol,
o-bromophenol,
m-bromophenol, p-bromophenol,
p-tert-amylphenol,
p-nitrophenol,
p-cyclohexylphenol,
salicylic acid, and
beta-naphthol, the ratio of milliliters of aqueous formaldehyde to grams of said ether being about from 10:1 to 50:1, respectively; and the said phenolic compound being present in an amount about from 0.1% to 100% of the weight of the said ether.

2. The process of claim 1 wherein the phenolic compound is phenol.

3. The process of claim 1 wherein the phenolic compound is o-chlorophenol.
4. The process of claim 1 wherein the phenolic compound is m-chlorophenol.
5. The process of claim 1 wherein the phenolic compound is p-chlorophenol.
6. The process of claim 1 wherein the phenolic compound is o-bromophenol.
7. The process of claim 1 wherein the phenolic compound is m-bromophenol.
8. The process of claim 1 wherein the phenolic compound is p-bromophenol.
9. The process of claim 1 wherein the phenolic compound is p-tert-amylphenol.
10. The process of claim 1 wherein the phenolic compound is p-nitrophenol.
11. The process of claim 1 wherein the phenolic compound is p-cyclohexylphenol.
12. The process of claim 1 wherein the phenolic compound is salicylic acid.
13. The process of claim 1 wherein the phenolic compound is beta-naphthol.
14. A process for reacting a partial 2-aminoethyl cellulose ether of cotton, wherein the nitrogen content of the said ether is about from 0.3% to 1.5%, with an aqueous mixture of formaldehyde and a ketone selected from the group consisting of acetone,
acetophenone,
mesityl oxide,
2,4-pentanedione,
1,3-dichloro-2-propanone,
2,4-dihydroxybenzophenone,
2-hydroxy-4-methoxybenzophenone,
2-hydroxy-4,4'-dimethoxybenzophenone, and
2,2',4,4'-tetrahydroxybenzophenone, the ratio of milliliters of aqueous formaldehyde to grams of said ether being about from 10:1 to 50:1, respectively; and the said ketone being present in an amount about from 0.1% to 100% of the weight of the said ether.
15. The process of claim 14 wherein the ketone is acetone.
16. The process of claim 14 wherein the ketone is acetophenone.
17. The process of claim 14 wherein the ketone is mesityl oxide.
18. The process of claim 14 wherein the ketone is 2,4-pentanedione.
19. The process of claim 14 wherein the ketone is 1,3-dichloro-2-propanone.
20. The process of claim 14 wherein the ketone is 2,4-dihydroxybenzophenone.
21. The process of claim 14 wherein the ketone is 2-hydroxy-4-methoxybenzophenone.
22. The process of claim 14 wherein the ketone is 2-hydroxy-4,4'-dimethoxybenzophenone.
23. The process of claim 14 wherein the ketone is 2,2',4,4'-tetrahydroxybenzophenone.
24. A process for reacting a partial 2-aminoethyl cellulose ether of cotton, wherein the nitrogen content of the said ether is about from 0.3% to 1.5%, with an aqueous mixture of formaldehyde and a compound having a hydrogen atom activated by two adjacent carbonyl, nitrile, or sulfone groups, said compound selected from the group consisting of

| | |
|---|---|
| malonic acid, | ethylacetoacetate, |
| cyanoacetic acid, | acetoacetanilide, and |
| malononitrile, | trimethylene trisulfone, |
| malonamide, | | the ratio of milliliters of aqueous formaldehyde to grams of said ether being about from 10:1 to 50:1, respectively; and the said compound selected is about from 0.1% to 100% of the weight of the said ether.

25. The process of claim 24 wherein the compound selected is malonic acid.
26. The process of claim 24 wherein the compound selected is cyanoacetic acid.
27. The process of claim 24 wherein the compound selected is malononitrile.
28. The process of claim 24 wherein the compound selected is malonamide.
29. The process of claim 24 wherein the compound selected is ethylacetoacetate.
30. The process of claim 24 wherein the compound selected is acetoacetanilide.
31. The process of claim 24 wherein the compound selected is trimethylene trisulfone.
32. A process for reacting a partial 2-aminoethyl cellulose ether of cotton, wherein the nitrogen content of said ether is about from 0.3% to 1.5%, with an aqueous mixture of formaldehyde and an indicator of the aromatic type, said indicator having a hydrogen atom in an activated position relative to a phenolic hydroxy group, said indicator selected from the group consisting of aurin C.I. 43800,
carmine C.I. 75470,
o-cresolphthalein,
o-cresolsulfonphthalein,
5',5''-dibromo-o-cresolsulfonphthalein,
3',3''-dibromothymolsulfonphthalein,
phenolphthalein,
phenolsulfonphthalein,
quinizarin-2-sulfonic acid, and
resazurin, the ratio of milliliters of aqueous formaldehyde to grams of said ether being about from 10:1 to 50:1, respectively; and the said indicator of the aromatic type being present in an amount about from 0.1% to 100% of the weight of the said ether.

33. The process of claim 32 wherein the indicator of the aromatic type is aurin C.I. 43800.
34. The process of claim 32 wherein the indicator of the aromatic type is carmine C.I. 75470.
35. The process of claim 32 wherein the indicator of the aromatic type is o-cresolphthalein.
36. The process of claim 32 wherein the indicator of the aromatic type if o-cresolsulfonphthalein.
37. The process of claim 32 wherein the indicator of the aromatic type is 5',5''-dibromo-o-cresolsulfonphthalein.
38. The process of claim 32 wherein the indicator of the aromatic type is 3',3''-dibromothymosulfonphthalein.
39. The process of claim 32 wherein the indicator of the aromatic type is phenolphthalein.
40. The process of claim 32 wherein the indicator of the aromatic type is phenolsulfonphthalein.
41. The process of claim 32 wherein the indicator of the aromatic type is quinizarin-2-sulfonic acid.
42. The process of claim 32 wherein the indicator of the aromatic type is resazurin.
43. A process for reacting a partial 2-aminoethyl cellulose ether of cotton, wherein the nitrogen content of said ether is about from 0.3% to 1.5%, with an aqueous mixture of formaldehyde and nitromethane, the ratio of milliliters of aqueous formaldehyde to grams of said ether being about from 10:1 to 50:1, respectively; and the said nitromethane being present in an amount about from 0.1% to 100% of the weight of the said ether.
44. A process for reacting a partial 2-aminoethyl cellulose ether of cotton, wherein the nitrogen content of the said ether is about from 0.3% to 1.5%, with an aqueous mixture of formaldehyde and fluorescein, the ratio of milliliters of aqueous formaldehyde to grams of said ether being about from 10:1 to 50:1, respectively; and the said fluorescein being present in an amount about from 0.1% to 100% of the weight of the said ether.
45. A process for reacting a partial 2-aminoethyl cellulose ether of cotton, wherein the nitrogen content of the said ether is about from 0.3% to 1.5%, with an aqueous mixture of formaldehyde and a fluorescein halogen derivative selected from the group consisting of 4',5'-dibromofluorescein, and
2',7'-dichlorofluorescein, the ratio of milliliters of aqueous formaldehyde to grams of said ether being about from 10:1 to 50:1, respectively; and the said fluorescein halogen derivative being present in an amount about from 0.1% to 100% of the weight of the said ether.

46. The process of claim 45 wherein the fluorescein halogen derivative is 4',5'-dibromofluorescein.

47. The process of claim 45 wherein the fluorescein halogen derivative is 2',7'-dichlorofluorescein.

References Cited
UNITED STATES PATENTS

| | | | |
|---|---|---|---|
| 2,668,096 | 2/1954 | Reeves et al. | 8—120 XR |
| 2,793,930 | 5/1957 | Compton et al. | 8—129 |

MAYER WEINBLATT, *Primary Examiner.*